(12) United States Patent
O'Dea et al.

(10) Patent No.: US 10,852,727 B2
(45) Date of Patent: Dec. 1, 2020

(54) SYSTEM AND METHOD FOR CONTROL OF AN AUTONOMOUS VEHICLE

(71) Applicant: GM GLOBAL TECHNOLOGY OPERATIONS LLC, Detroit, MI (US)

(72) Inventors: Kevin A. O'Dea, Ann Arbor, MI (US); Sami Ahmed, Orion Township, MI (US); Paul R. Williams, Northville, MI (US)

(73) Assignee: GM GLOBAL TECHNOLOGY OPERATIONS LLC, Detriut, MI (US)

( * ) Notice: Subject to any disclaimer, the term of this patent is extended or adjusted under 35 U.S.C. 154(b) by 165 days.

(21) Appl. No.: 16/199,667

(22) Filed: Nov. 26, 2018

(65) Prior Publication Data

US 2020/0166930 A1    May 28, 2020

(51) Int. Cl.
| | |
|---|---|
| *G05D 1/00* | (2006.01) |
| *G08G 1/16* | (2006.01) |
| *B60W 30/18* | (2012.01) |

(52) U.S. Cl.
CPC ..... *G05D 1/0061* (2013.01); *B60W 30/18163* (2013.01); *G05D 1/0088* (2013.01); *G08G 1/167* (2013.01); *G05D 2201/0213* (2013.01)

(58) Field of Classification Search
CPC .............. G05D 1/0061; G05D 1/0088; G05D 2201/0213; B60W 30/18163; G08G 1/167
See application file for complete search history.

(56) References Cited

U.S. PATENT DOCUMENTS

| | | | | |
|---|---|---|---|---|
| 10,435,031 | B2* | 10/2019 | Shibata | G08G 1/096716 |
| 10,579,070 | B1* | 3/2020 | Konrardy | G01C 21/3415 |
| 2003/0210806 | A1* | 11/2003 | YoichiShintani | G08G 1/20 382/104 |
| 2003/0212567 | A1* | 11/2003 | Shintani | G06Q 99/00 725/105 |
| 2005/0015203 | A1* | 1/2005 | Nishira | G08G 1/167 701/301 |
| 2009/0157286 | A1* | 6/2009 | Saito | B60W 30/16 701/117 |
| 2012/0253580 | A1* | 10/2012 | Al-Mahnna | G01C 21/3697 701/23 |
| 2013/0184926 | A1* | 7/2013 | Spero | B60W 30/18163 701/26 |
| 2013/0338868 | A1* | 12/2013 | Essame | B60W 30/18163 701/23 |

(Continued)

*Primary Examiner* — Angelina Shudy

(57) ABSTRACT

An automotive vehicle includes at least one actuator configured to control vehicle steering, shifting, acceleration, or braking, at least one sensor configured to provide signals indicative of road geometry in the vicinity of the vehicle, and a controller in communication with the sensor and the actuator. The controller is configured to selectively control the actuator in an autonomous driving mode based on signals from the sensor. The controller is configured to automatically determine a first time parameter based on a distance to a merge location between a current driving lane of the vehicle and a target lane adjacent the current driving lane in response to signals from the sensor, to automatically determine a second time parameter based on a calculated merge completion time, and to automatically discontinue autonomous control of the actuator based on a difference between the first time parameter and the second time parameter.

5 Claims, 4 Drawing Sheets

(56) References Cited

U.S. PATENT DOCUMENTS

| | | | |
|---|---|---|---|
| 2015/0353087 A1* | 12/2015 | Niino | B60W 50/14 |
| | | | 701/96 |
| 2016/0046290 A1* | 2/2016 | Aharony | B60W 10/04 |
| | | | 701/41 |
| 2016/0214612 A1* | 7/2016 | Kashiba | B60W 30/18163 |
| 2016/0272204 A1* | 9/2016 | Takahashi | B60W 30/16 |
| 2016/0297447 A1* | 10/2016 | Suzuki | B60W 30/18163 |
| 2017/0088144 A1* | 3/2017 | Shibata | G08G 1/096725 |
| 2017/0235307 A1* | 8/2017 | Asakura | B60W 40/12 |
| | | | 701/23 |
| 2017/0240176 A1* | 8/2017 | Aoki | G08G 1/167 |
| 2018/0215387 A1* | 8/2018 | Takae | B60W 30/0956 |
| 2018/0240345 A1* | 8/2018 | So | B60W 30/08 |
| 2019/0061766 A1* | 2/2019 | Nishiguchi | B60W 30/18163 |
| 2019/0071076 A1* | 3/2019 | Nakatsuka | B60W 30/0953 |
| 2019/0250001 A1* | 8/2019 | Nakamura | G05D 1/0088 |
| 2020/0307589 * | 10/2020 | Li | B60W 30/18163 |

\* cited by examiner

SYSTEM AND METHOD FOR CONTROL OF AN AUTONOMOUS VEHICLE

INTRODUCTION

The present disclosure relates to vehicles controlled by automated driving systems, particularly those configured to automatically control vehicle steering, acceleration, and braking during a drive cycle without human intervention.

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes at least one actuator configured to control vehicle steering, shifting, acceleration, or braking. The vehicle also includes at least one sensor configured to provide signals indicative of road geometry in the vicinity of the vehicle. The vehicle further includes a controller in communication with the at least one sensor and the at least one actuator. The controller is configured to selectively control the at least one actuator in an autonomous driving mode based on signals from the at least one sensor. The controller is configured to automatically determine a first time parameter based on a distance to a merge location between a current driving lane of the vehicle and a target lane adjacent the current driving lane in response to signals from the at least one sensor, to automatically determine a second time parameter based on a calculated merge completion time, and to automatically discontinue autonomous control of the at least one actuator based on a difference between the first time parameter and the second time parameter.

In an exemplary embodiment, the second time parameter is based on a speed limit of the target lane, a first road geometry parameter of the current lane, a second road geometry parameter of the target lane, a current speed of the vehicle, or a traffic density parameter of the target lane.

In an exemplary embodiment, the controller is further configured to calculate a tuning parameter based on signals from the at least one sensor, and to automatically discontinue autonomous control of the at least one actuator in response to the difference between the first time parameter and the second time parameter being less than the tuning parameter. In such embodiments, the controller may be further configured to calculate a second tuning parameter based on signals from the at least one sensor, to automatically discontinue autonomous control of the at least one actuator in response to the difference between the first time parameter and the second time parameter being less than the tuning parameter when a merge maneuver has not been initiated, and to automatically discontinue autonomous control of the at least one actuator in response to the difference between the first time parameter and the second time parameter being less than the second tuning parameter when the merge maneuver has not been completed.

A method of controlling a vehicle according to the present disclosure includes providing the vehicle with an actuator configured to control a vehicle steering system, a sensor configured to provide signals indicative of road geometry in the vicinity of the vehicle, and a controller in communication with the actuator and the sensor. The method additionally includes controlling the actuator, via the controller, in an autonomous driving mode. The method also includes determining, via the controller, a distance to a merge location between a current driving lane of the vehicle and a target lane adjacent the current driving lane based on a signal from the sensor. The method further includes calculating, via the controller, a first time parameter based on the distance to the merge location. The method additionally includes calculating, via the controller, a merge completion time to complete the merge between the current driving lane and the target lane. The method also includes determining, via the controller, whether a merge criterion is satisfied based on a difference between the first time parameter and the second time parameter. The method further includes discontinuing autonomous control of the actuator in response to the merge criterion being satisfied.

In an exemplary embodiment, the second time parameter is based on a speed limit of the target lane, a first road geometry parameter of the current lane, a second road geometry parameter of the target lane, a current speed of the vehicle, or a traffic density parameter of the target lane.

In an exemplary embodiment, the method additionally includes calculating a tuning parameter based on signals from the sensor. In such embodiments, the merge criterion is satisfied in response to the difference between the first time parameter and the second time parameter being less than the tuning parameter. Such embodiments may additionally include calculating a second tuning parameter based on signals from the sensor. In such embodiments, the merge criterion is satisfied in response to the difference between the first time parameter and the second time parameter being less than the tuning parameter when a merge maneuver has not been initiated or in response to the difference between the first time parameter and the second time parameter being less than the second tuning parameter when the merge maneuver has not been completed.

In an exemplary embodiment, the method additionally includes, in response to the merge criterion not being satisfied, automatically controlling the actuator, via the controller, to merge with the target Embodiments according to the present disclosure provide a number of advantages. For example, the present disclosure provides system and method for controlling an automotive vehicle to autonomously attempt to merge from one lane to another, and to return control to a human operator when human control is desirable.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
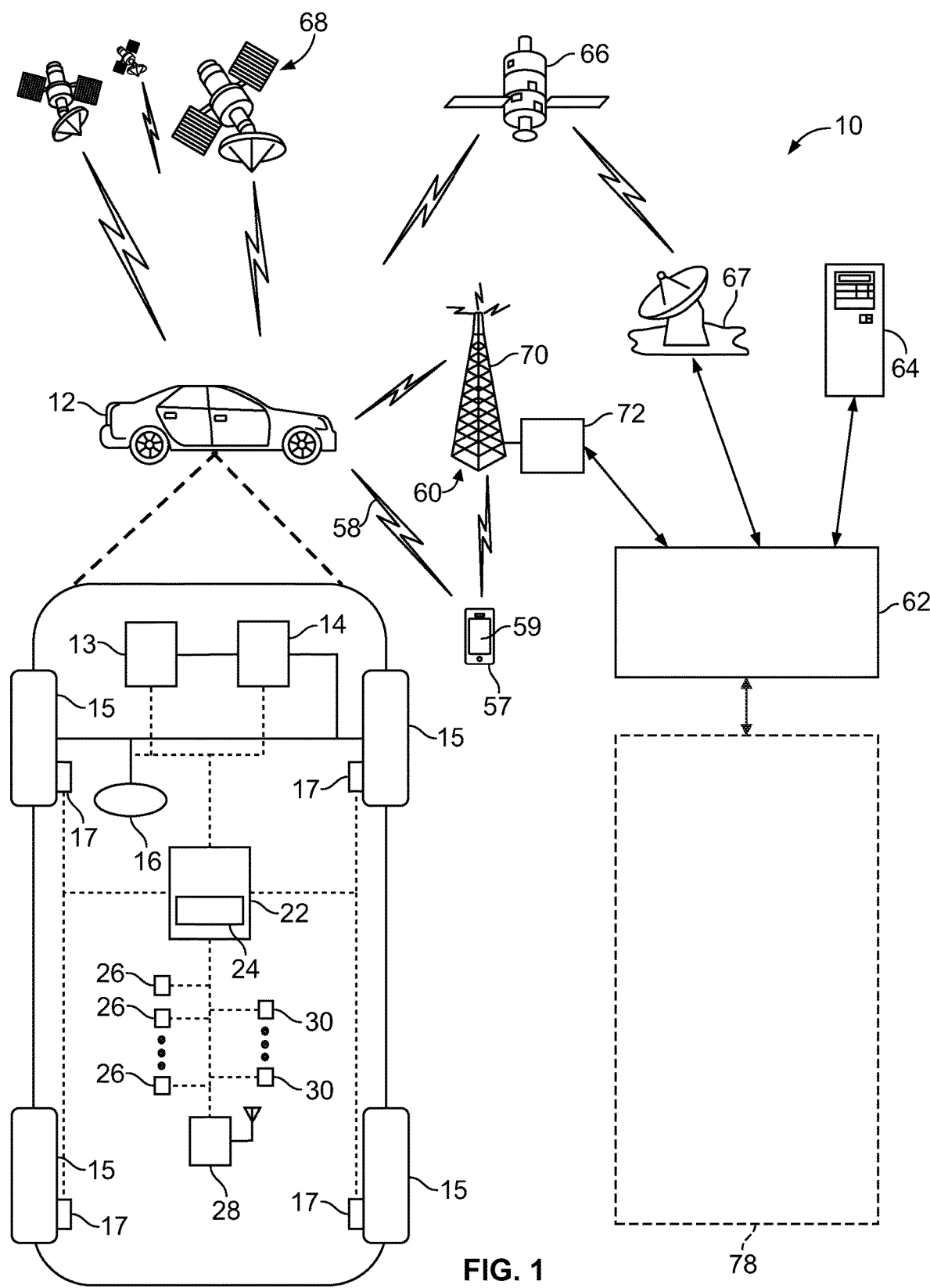
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The motor vehicle 12 may be referred to as a host vehicle. The communication and control system 10 for the host vehicle 12 generally includes one or more wireless carrier systems 60, a land communications network 62, a computer 64, a mobile device 57 such as a smart phone, and a remote access center 78.

The host vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The host vehicle 12 includes a propulsion system 13, which may in various embodiments include an internal combustion engine, an electric machine such as a traction motor, and/or a fuel cell propulsion system.

The host vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The host vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The host vehicle 12 additionally includes a steering system 16. While depicted as including a steering wheel for illustrative purposes, in some embodiments contemplated within the scope of the present disclosure, the steering system 16 may not include a steering wheel.

The host vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Three automation system. A Level Three system indicates "Conditional Automation", referring to the driving mode-specific performance by an automated driving system of all aspects of the dynamic driving task with the expectation that the human operator will respond appropriately to a request to intervene.

Other embodiments according to the present disclosure may be implemented in conjunction with so-called Level One or Level Two automation systems. A Level One system indicates "driver assistance", referring to the driving mode-specific execution by a driver assistance system of either steering or acceleration using information about the driving environment and with the expectation that the human operator perform all remaining aspects of the dynamic driving task. A Level Two system indicates "Partial Automation", referring to the driving mode-specific execution by one or more driver assistance systems of both steering and acceleration using information about the driving environment and with the expectation that the human operator perform all remaining aspects of the dynamic driving task.

Still other embodiments according to the present disclosure may also be implemented in conjunction with so-called Level Four or Level Five automation systems. A Level Four system indicates "high automation", referring to the driving mode-specific performance by an automated driving system of all aspects of the dynamic driving task, even if a human operator does not respond appropriately to a request to intervene. A Level Five system indicates "full automation", referring to the full-time performance by an automated driving system of all aspects of the dynamic driving task under all roadway and environmental conditions that can be managed by a human operator.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the host vehicle 12. One of the networked devices that can communicate with the host vehicle 12 via the wireless communication system 28 is the mobile device 57. The mobile device 57 can include computer processing capability, a transceiver capable of communicating signals 58 using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving signals from GPS satellites 68 and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the host vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the host vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the host vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the host vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the host vehicle 12. The computer 64 may be in communication with at least one supplemental vehicle in addition to the host vehicle 12. The host vehicle 12 and any supplemental vehicles may be collectively referred to as a fleet.

Figure 2:
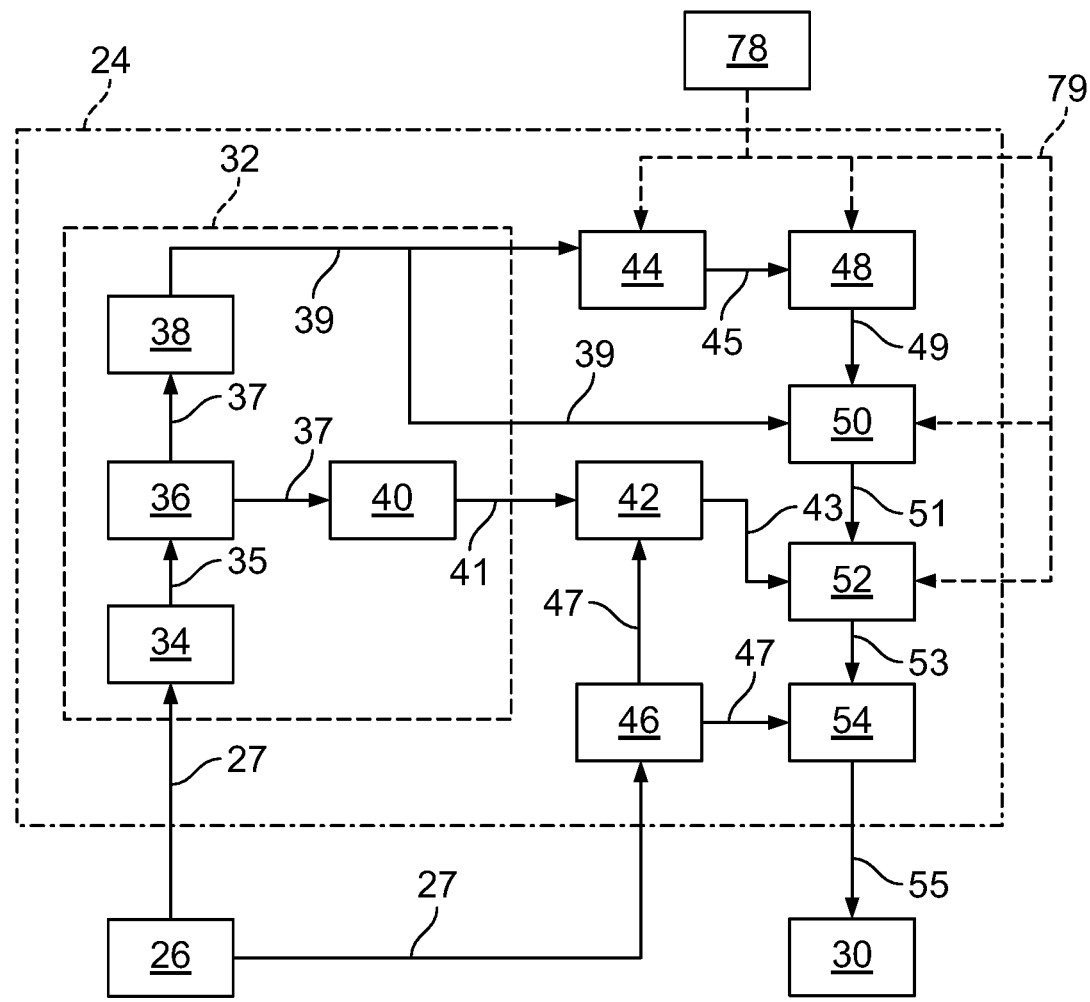
FIG. 2 is a schematic block diagram of an automated driving system (ADS) for a vehicle according to an embodiment of the present disclosure.

As shown in FIG. 2, the ADS 24 includes multiple distinct systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of the host vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the host vehicle 12 during operation and mapping data "pushed" to the host vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the host vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

As discussed above, in embodiments where the ADS 24 is a Level One through Level Three ADS, there is an expectation that the human operator will, under certain operating conditions, resume control of the vehicle 12. It is therefore desirable to define methods by which the ADS 24 can determine whether and when to transfer control of the vehicle 12 to the human operator.

Figure 3:
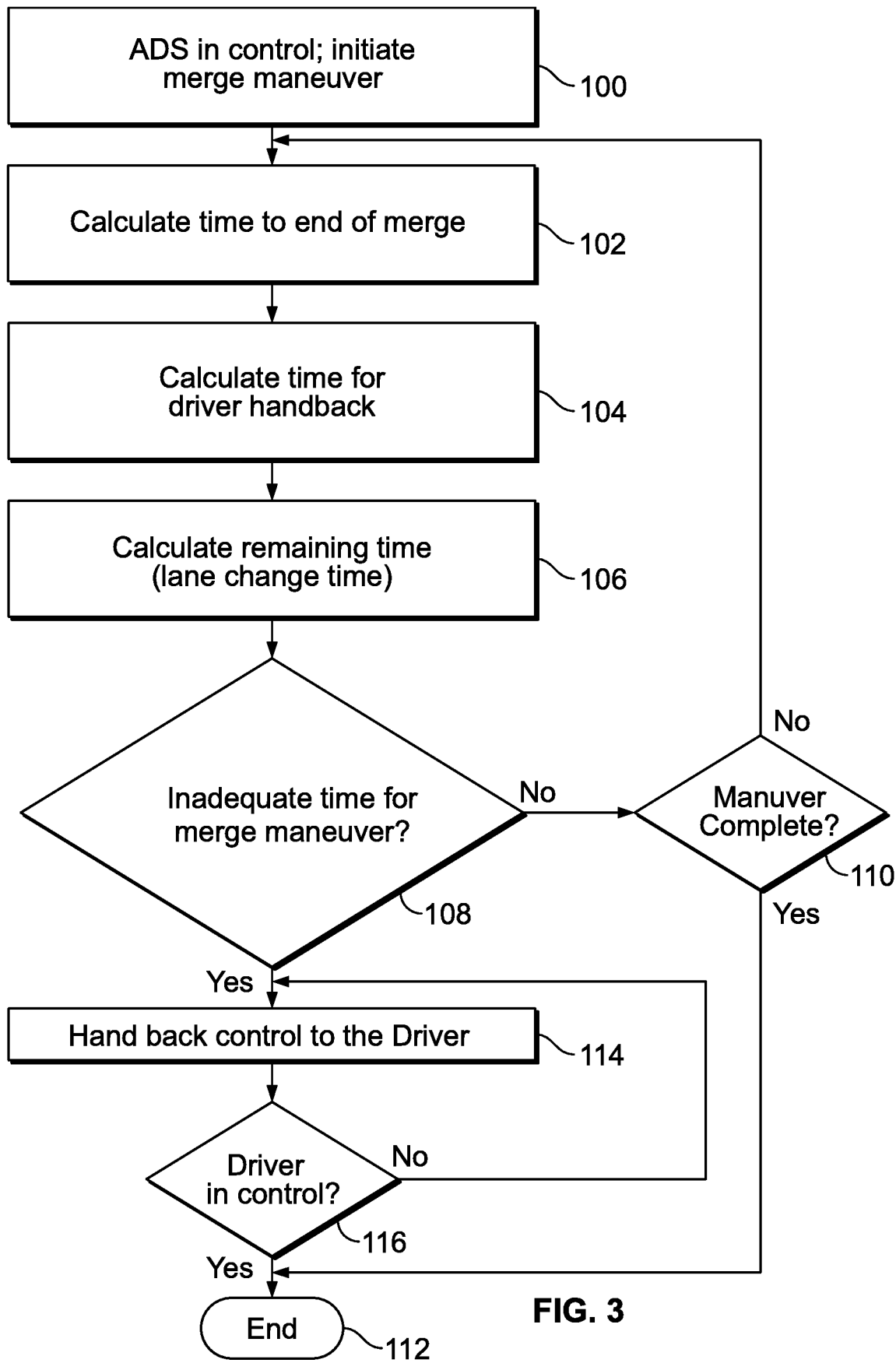
FIG. 3 is an illustrative representation of a vehicle according to an embodiment of the present disclosure.

Referring now to FIG. 3, a method of controlling a vehicle according to the present disclosure is illustrated in flowchart form. While the method will be described in conjunction with the vehicle 12 illustrated in FIGS. 1 and 2 for exemplary purposes, in other embodiments the method may be implemented in vehicles having other configurations. The method begins at block 100 with the ADS 24 controlling the vehicle 12, which may subsequently be referred to as a host vehicle, in an autonomous driving mode while initiating a merge maneuver. As used herein, a merge maneuver refers to a vehicle maneuver performed when a current driving lane of the host vehicle 12 merges with an adjacent driving lane, which may be referred to as a target lane. Such maneuvers may be required when the host vehicle 12 is on an on-ramp merging with a highway, when a roadway narrows, or in any other merge situation.

An available merge time parameter $T_{end}$ is calculated, as illustrated at block 102. The available merge time refers to a maximum available time within which the host vehicle 12 may complete the merge maneuver while complying with traffic rules and norms. In an exemplary embodiment, the available merge time parameter $T_{end}$ is calculated based on a distance to a merge location $D_{end}$ and a current vehicle speed $V_c$, e.g. as $T_{end}=D_{end}/V_c$. The distance to the merge location refers to a distance between the current location of the host vehicle 12 and the location where the current driving lane of the host vehicle 12 merges with the target lane, as measured along the current driving lane. The distance to the merge location may be determined based on live sensor data, e.g. signals from one or more of the sensor(s) 26, mapping data stored in non-transient computer-readable memory, other data, or any suitable combination thereof. The current vehicle speed may be determined based on signals from one or more of the sensor(s) 26 or any other suitable source.

A reserved handback time parameter $T_{hb}$ is calculated, as illustrated at block 104. The reserved handback time parameter refers to a time quantity reserved to revert control of the host vehicle 12 to a human operator and for the human operator to perform the merge maneuver. In an exemplary embodiment, the reserved handback time parameter $T_{hb}$ may be obtained from a lookup table or otherwise calculated based on a speed limit, road geometry, current speed, and traffic density. In other embodiments, the reserved handback time parameter $T_{hb}$ may be based on additional or other parameters including, but not limited to, driving experience of the human operator, size or maneuverability of the host vehicle 12, current visibility or weather conditions, or other suitable factors.

An allowable autonomous lane change time parameter $T_{lc}$ is calculated, as illustrated at block 106. The allowable autonomous lane change time parameter $T_{lc}$ refers to the time in which the ADS 24 may attempt to complete the lane change. In an exemplary embodiment, the allowable autonomous lane change time parameter $T_{lc}$ is calculated as $T_{lc}=T_{end}-T_{hb}$.

A determination is made of whether adequate time remains for the ADS to attempt the merge maneuver, as illustrated at operation 108. In an exemplary embodiment, this determination is satisfied in response to $T_{lc}<k_1$ when a lane change maneuver has not been initiated and/or in response to $T_{lc}<k_2$ when a lane change maneuver has not been completed. In such embodiments, $k_1$ and $k_2$ are tuning parameters which may be obtained from a lookup table or otherwise determined based on road geometry and/or other factors. In such embodiments, $k_1$ and $k_2$ may be selected based on performance testing of the vehicle 12 and the ADS 24.

In response to the determination of operation 108 being negative, i.e. that allowable time remains for the ADS 24 to continue to attempt the merge maneuver, then a determination is made of whether the merge maneuver has been completed, as illustrated at operation 110. The determination may be satisfied in response to the vehicle 12 having fully maneuvered into the target lane.

In response to the determination of operation 110 being negative, i.e. the merge maneuver has not been completed, control returns to block 102. The ADS 24 thereby continues to attempt to perform the merge maneuver so long as allowable time remains for it to do so while reserving the handback time parameter $T_{hb}$.

In response to the determination of operation 110 being positive, i.e. the merge maneuver has been completed, the algorithm terminates at block 112.

Returning to operation 108, in response to the determination being negative, i.e. that allowable time no longer remains for the ADS 24 to continue to attempt the merge maneuver, then the ADS attempts to relinquish control to the human operator, as illustrated at block 114. This may include signaling an alert to the human operator, e.g. an audio, visual, or haptic alert, indicating that the human operator should take control.

A determination is made of whether the human operator is in control of the vehicle, as illustrated at block 116. This determination may be based on, for example, a determination that the operator has actuated one or more control interfaces such as a steering wheel, brake pedal, or accelerator.

In response to the determination of operation 116 being negative, control returns to block 114. The algorithm thereby attempts to return control to the human operator.

In response to the determination of operation 116 being positive, the algorithm ends at block 112.

Figure 4:
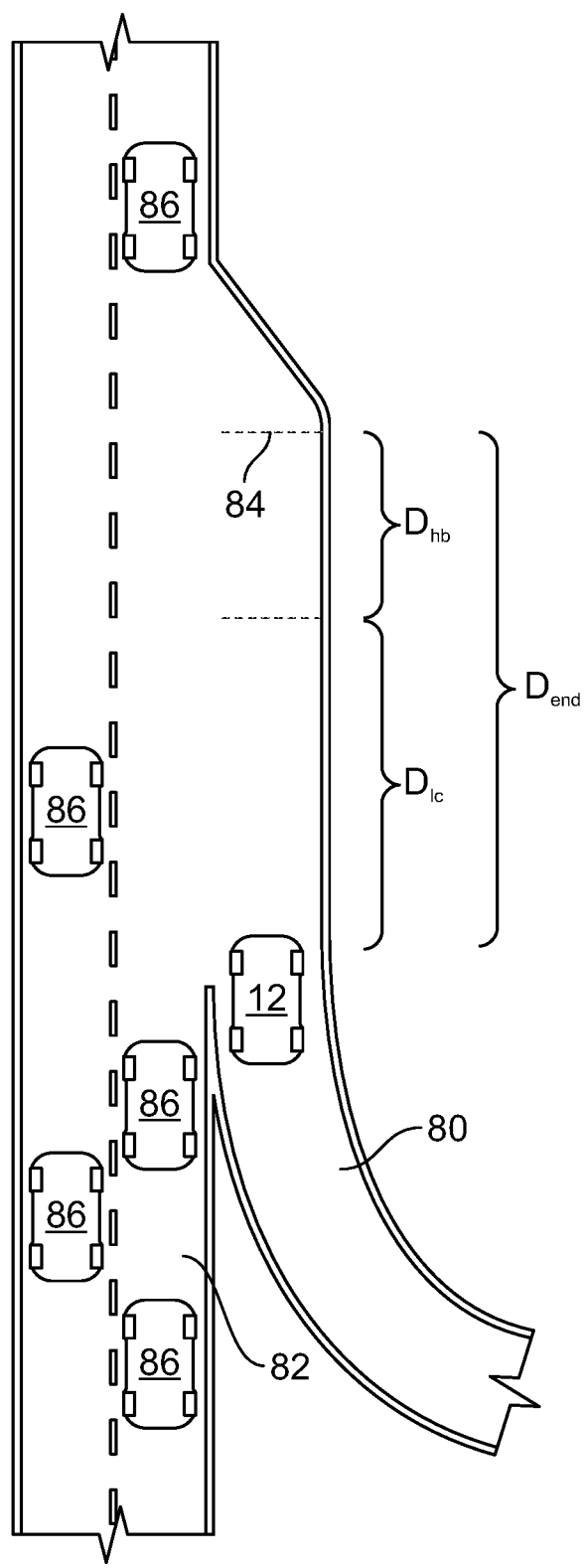
FIG. 4 is a flowchart representation of a method of controlling a vehicle according to an embodiment of the present disclosure.

Referring now to FIG. 4, control of the host vehicle 12 according to the present disclosure is illustrated. In the illustrated configuration, the host vehicle 12 is travelling in a current lane 80. The ADS 24 determines that the current lane 80 will merge with a target lane 82 at a merge location 84, e.g. based on signals from one or more of the sensor(s) 26, mapping data stored in non-transient computer-readable memory, other data, or any suitable combination thereof. The merge location 84 refers to a location at which the current lane 80 joins with the target lane 82 such that only one vehicle at a time may traverse the merged lane beyond the merge location 84.

As discussed above with respect to FIG. 3, a distance $D_{end}$ to the merge location 84 is calculated, and a corresponding merge time parameter $T_{end}$ is calculated based on $D_{end}$.

The reserved handback time parameter $T_{hb}$ is thereafter calculated. As discussed above, the value of $T_{hb}$ may be determined based on various parameters, such as a speed limit of the target lane 82, road geometry of the current lane 80 and the target lane 82, current speed of the host vehicle 12, and traffic density of target vehicles 86 on the target lane 82 and adjacent lanes. A distance parameter $D_{hb}$ corresponding to the handback time parameter $T_{hb}$ is illustrated in FIG. 4, but need not be explicitly calculated.

The allowable autonomous lane change time parameter $T_{lc}$ is calculated based on $T_{end}$ and $T_{hb}$, as discussed above. A corresponding distance parameter $D_{lc}$ is illustrated in FIG. 4, but need not be explicitly calculated.

A determination is then made of whether adequate time remains for the ADS to attempt the merge maneuver, based on a comparison of $T_{lc}$ to tuning parameters $k_1$ and $k_2$, as discussed above with respect to FIG. 3. Based on this comparison, the ADS 24 may determine whether to continue to attempt the merge maneuver or return control to the human operator.

As may be seen, the present disclosure provides a system and method for controlling an automotive vehicle to autonomously attempt to merge from one lane to another, and to return control to a human operator when human control is desirable.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
   at least one actuator configured to control vehicle steering, shifting, acceleration, or braking;
   at least one sensor configured to provide signals indicative of road geometry in the vicinity of the vehicle; and
   a controller configured to selectively control the at least one actuator in an autonomous driving mode, to automatically determine a first time parameter based on a distance to a merge location between a current driving lane of the vehicle and a target lane adjacent the current driving lane in response to signals from the at least one sensor, to automatically determine a second time parameter based on a calculated merge completion time, and to automatically discontinue autonomous control of the at least one actuator based on a difference between the first time parameter and the second time parameter, wherein the controller is further configured to calculate a tuning parameter based on signals from the at least one sensor, to calculate a second tuning parameter based on signals from the at least one sensor, to automatically discontinue autonomous control of the at least one actuator in response to the difference between the first time parameter and the second time parameter being less than the tuning parameter when a merge maneuver has not been initiated, and to automatically discontinue autonomous control of the at least one actuator in response to the difference between the first time parameter and the second time parameter being less than the second tuning parameter when the merge maneuver has not been completed.

2. The automotive vehicle of claim 1, wherein the second time parameter is based on a speed limit of the target lane, a first road geometry parameter of the current lane, a second road geometry parameter of the target lane, a current speed of the vehicle, or a traffic density parameter of the target lane.

3. A method of controlling a vehicle, the method comprising:
   providing the vehicle with an actuator configured to control a vehicle steering system, a sensor configured to provide signals indicative of road geometry in the vicinity of the vehicle, and a controller in communication with the actuator and the sensor;
   controlling the actuator, via the controller, in an autonomous driving mode;
   determining, via the controller, a distance to a merge location between a current driving lane of the vehicle and a target lane adjacent the current driving lane based on a signal from the sensor;
   calculating, via the controller, a first time parameter based on the distance to the merge location;
   calculating, via the controller, a merge completion time to complete the merge between the current driving lane and the target lane;
   calculating a tuning parameter based on signals from the sensor,
   calculating a second tuning parameter based on signals from the sensor,
   determining, via the controller, whether a merge criterion is satisfied based on a difference between the first time parameter and the second time parameter, wherein the merge criterion is satisfied in response to the difference between the first time parameter and the second time parameter being less than the tuning parameter when a merge maneuver has not been initiated or in response to the difference between the first time parameter and the second time parameter being less than the second tuning parameter when the merge maneuver has not been completed; and
   discontinuing autonomous control of the actuator in response to the merge criterion being satisfied.

4. The method of claim 3, wherein the second time parameter is based on a speed limit of the target lane, a first road geometry parameter of the current lane, a second road geometry parameter of the target lane, a current speed of the vehicle, or a traffic density parameter of the target lane.

5. The method of claim 3, further comprising, in response to the merge criterion not being satisfied, automatically controlling the actuator, via the controller, to merge with the target lane.

* * * * *